US006865337B1

(12) United States Patent
Muller (10) Patent No.: US 6,865,337 B1
(45) Date of Patent: Mar. 8, 2005

(54) SYSTEM AND METHOD FOR DETECTING MODIFICATIONS OF VIDEO SIGNALS DESIGNED TO PREVENT COPYING BY TRADITIONAL VIDEO TAPE RECORDERS

(75) Inventor: Stephen C. Muller, Solana Beach, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 916 days.

(21) Appl. No.: 09/634,265

(22) Filed: Aug. 8, 2000

(51) Int. Cl.[7] ............................................... H04N 5/91
(52) U.S. Cl. ............................ 386/94; 360/60; 380/201
(58) Field of Search ........................ 386/1, 94; 360/60; 380/201, 203; 713/193

(56) References Cited

U.S. PATENT DOCUMENTS

| 4,631,603 | A |   | 12/1986 | Ryan ............................ 360/37 |
| 4,695,901 | A |   | 9/1987  | Ryan ............................. 380/5 |
| 4,819,098 | A |   | 4/1989  | Ryan ......................... 360/37.1 |
| 4,907,093 | A | * | 3/1990  | Ryan ............................ 386/94 |
| 5,130,810 | A |   | 7/1992  | Ryan ........................... 358/310 |
| 5,157,510 | A | * | 10/1992 | Quan et al. .................... 386/94 |
| 5,194,965 | A | * | 3/1993  | Quan et al. .................... 386/94 |
| 5,583,936 | A |   | 12/1996 | Wonfor et al. ................. 380/15 |
| 6,026,193 | A | * | 2/2000  | Rhoads ....................... 382/232 |

OTHER PUBLICATIONS http://www.cs.tut.fi/~pam/macrovision/, by Antti Paarlahti, "A Implementation of Macrovision remover," printed Aug. 8, 2000.

http://www.ee.ualberta.ca/~charro/cookbook/video/Macro-Vision.doc, by Antti Paarlahti, "Macrovision FAQ v1.0".

http://www.itacs.uow.edu.au/people/adam/mv_faq.html, by Antti Paarlahti, "Macrovision FAQ V1.2," (Nov. 12, 1996)), printed Aug. 8, 2000.

http://www.macrovision.com/products.html, "Products and Technologies," printed Aug. 8, 2000.

Intercase Intel Technology, Single–Chip Video Capture for PCI, Bt848/848A/849A, Brooktree Division, Printed Feb. 1997.

Rockwell Semiconductor Systems, Single–Chip Video and Broadcast Audio, Bt878/879, printed Mar. 1998.

* cited by examiner

*Primary Examiner*—Andrew Faile
*Assistant Examiner*—Alicia M. Duggins
(74) *Attorney, Agent, or Firm*—Hogan & Hartson, LLP (57) ABSTRACT

A system and method for detecting whether a video signal is modified by a video-tape-recorder-design based anti-copying process. A proper portion of the video signal is identified and filtered, and potential anti-copying artifacts in the filtered signal are counted by comparing the filtered output against a threshold derived from the video-tape-recorder-design based anti-copying process. By cross-correlating the number of potential anti-copying artifacts, found on multiple scan lines across multiple frames, with an expected minimum range and/or number of anti-copying artifacts derived from the video-tape-recorder-design based anti-copying process, anti-copying modifications of the video signal are detected. In this fashion, traditional video-tape-recorder-design based anti-copying processes are applied to modem digital video recording systems.

11 Claims, 6 Drawing Sheets

SYSTEM AND METHOD FOR DETECTING MODIFICATIONS OF VIDEO SIGNALS DESIGNED TO PREVENT COPYING BY TRADITIONAL VIDEO TAPE RECORDERS

BACKGROUND OF THE INVENTION

1. Field of the Invention

The present invention relates generally to the field of video-tape-recorder-design based anti-copying processes for video systems, and more particularly to the application of those processes to digital video recording systems.

2. Related Art

Televisions utilize cathode ray tubes (CRTs) to display video images. CRTs have electron guns that produce an electron beam. The beam is attracted to phosphors on the face of the CRT, activating the phosphors and causing them to emit light. The electron beam begins at the top left of the CRT and scans from left to right across the screen, illuminating pixels (which are comprised of the activated phosphors) in the process. Hence, the electron beam effectively draws horizontal lines of video, one pixel at a time.

The horizontal scan rate is the number of horizontal lines drawn per second by the electron beam generated by the electron gun in a video display. Television broadcast standards specify exact horizontal scan rates that must be strictly adhered to in television video signals. The National Television Standards Committee (NTSC) standards are used in North America and other parts of the world. The Phase Alteration Line/Sequential Couleur Avec Mémoire (PAL/SECAM, or PAL) standards are used in Europe and elsewhere.

The NTSC horizontal scan rate is 15.75 kHz and the PAL horizontal scan rate is 15.625 kHz. When the electron beam reaches the bottom of the display, one frame of video has been completed. The number of frames completed by the beam per second, or the number of times that the frame has been "refreshed", is the vertical scan, frame or "refresh" rate.

A television display uses an "interlaced" scanning format. Each frame of video is scanned out as two fields that are separated temporally and offset spatially in the vertical direction. Each field is drawn on the screen consecutively and in alternating fashion—first one field, then the other. Essentially, an image is drawn in two top-to-bottom passes: the first pass draws the "odd" lines (the first field) and the second pass draws the "even" lines (the second field). It follows that the number of lines in a field is one-half the number of lines in a frame. In NTSC, there are 262.5 lines per field (525 lines per frame), and in PAL, there are 312.5 lines per field (625 lines per frame). An interlaced scanning format is utilized in television video signals because of the relatively slow frame rate of a television. Interlacing the scan lines avoids "flicker" in the image in a manner well understood in the art. Under the television broadcast standards, there are exact field rates that must be strictly adhered to: 59.94 Hz for NTSC and 50 Hz for PAL.

Television signals comprise a composite waveform that contains a number of specifically placed and timed video and control signals. These include the active video signal; the color burst waveform; the horizontal and vertical sync pulses; and the horizontal and vertical blanking intervals. The active video signal contains encoded luminance and chrominance data for the image that is to be displayed on the screen. The color burst waveform provides a decoder with a reference for decoding the chrominance information contained in the active video signal. The horizontal and vertical sync pulses are control signals that signal to the decoder the start of new horizontal lines and new frames. The blanking intervals signal the decoder to shut off the electron beam while it is being retraced from the right edge to the left edge of the display, or from the bottom to the top of the display. Each of these signals is combined into one composite video waveform that is transmitted to the television on a one-wire connection.

The composite video waveform must be encoded in strict accordance with the applicable broadcast standard, such as NTSC or PAL. These standards specify important timing parameters such as the horizontal and vertical sync pulse widths, the rise and fall times of the pulses, and the position and number of cycles in the color burst. These timing parameters should generally not be substantially altered while encoding the waveform. Numerous problems can result from even slightly inaccurate timing. Errors in the pulse widths can lead to picture break up, and errors in the rise and fall times can make it difficult for the television receiving equipment to lock to the signals. However, these timing parameters can be altered to gain anti-copying benefits.

The creators of video content for distribution have always been concerned with protecting their copyright in the works they produce. With the development of video cassette recorders (VCRs) and, more recently, digital video recording systems, this concern has grown substantially in recent years. Copyright holders have profited significantly from the development and proliferation of video recording systems. However, this same technology now allows a single inexperienced person with a single copy of a video program to create numerous unauthorized copies of a copyrighted work, thereby substantially reducing the legitimate demand for a particular work. Without anti-copying systems in place, copyright holders run the risk of losing control of their works with a single broadcast or release on videocassette.

To aid copyright holders in maintaining their rightful control of their copyrighted works, video-tape-recorder-design based anti-copying processes have been developed. These processes take advantage of the timing parameters built into broadcast standards, such as NTSC and PAL, and the design differences between televisions and traditional VCRs. A prominent example is Macrovision's anti-taping process. An early version of Macrovision's anti-taping process is disclosed and described in U.S. Pat. No. 4,631,603, "Method and Apparatus for Processing a Video Signal so as to Prohibit the Making of Acceptable Video Tape Recordings Thereof." Further information regarding this process is available from Macrovision Corporation, 1341 Orleans Drive, Sunnyvale, Calif. 94089.

Anti-taping processes, such as Macrovision's process, utilize differences in the way traditional VCRs and televisions operate. Both VCRs and televisions have automatic gain control (AGC) circuits within them. However, the AGC circuits in typical VCRs are designed to respond quickly to change, whereas the AGC circuits in typical televisions respond to change slowly. Macrovision's anti-taping process modifies a television video signal so that a VCR will not record a viewable picture, but a television will continue to display the video signal properly.

Macrovision's process applies special waveforms to the video signal, which can be a broadcast signal, a VCR tape signal or the like. These waveforms prevent copying of the original by adding artifacts which have little effect on electronic devices, such as televisions, but which tend to confuse mechanical recording devices, such as VCRs. These artifacts include abrupt phase transitions added to the color strip, pseudo-sync pulses and AGC pulses added to predetermined scan lines in the vertical blanking interval (VBI), and additional AGC pulses added to the "back porch" of the video signal. The "back porch" is the portion of the video waveform that extends from the rising edge of a horizontal sync pulse to the beginning of the active video signal.

The pseudo-sync pulses are added to the predetermined scan lines in the VBI to fool the sync detection circuits of a recording VCR into believing a horizontal sync is occurring. Immediately after each such pseudo-sync pulse, an AGC pulse is added. The AGC pulses continuously vary in amplitude, and thereby fool the AGC circuits of the VCR into believing the blanking level is incorrect. Thus these circuits will attempt to adjust the gain, when no such adjustment is needed, thereby leading to the creation of generally unviewable pictures.

The problem with this type of anti-taping process is that current video recording technology is moving away from the traditional mechanical devices, exemplified by the typical VCR. For example, television video capture cards are electronic circuit boards, which can be coupled with a personal computer to enable a computer user to capture single frame images or whole video segments from a television video signal. The false pulses that normally throw off the time tracking of a VCR have little effect on the timing of the electronic hardware making up modern digital video recording systems.

Analog television signals, protected by video-tape-recorder-design based anti-copying processes, can be captured by digital video recording systems and saved in memory as digital video, thereby enabling easy copying of copyrighted video programs. In addition, modern digital VCRs can record analog television signals, protected by video-tape-recorder-design based anti-copying processes, without being fooled by the artifacts added to the signal. Thus, as recording systems move away from mechanical devices, such as traditional VCRs, to digital video recording systems, traditional video-tape-recorder-design based anti-copying processes become ineffective. Eventually, video-tape-recorder-design based anti-copying processes, such as Macrovision's process, will become obsolete unless effective methods are found to apply such anti-copying processes to modern digital video recording systems.

Therefore, what is needed is a system and method for applying traditional video-tape-recorder-design based anti-copying processes to modern digital video recording systems.

SUMMARY OF THE INVENTION

The present invention is directed toward a system and method for applying traditional video-tape-recorder-design based anti-copying processes to modern digital video recording systems.

The present invention provides a system and method for detecting whether a video signal is modified by a video-tape-recorder-design based anti-copying process. The video signal is sampled and a portion thereof, within which anti-copying artifacts may be encoded, is selected. This selected portion of the video signal is then filtered to remove noise, preferably by a low computational filter such as a moving average filter, while not eliminating the anti-copying artifacts that may be contained therein. The filtered signal is compared against a threshold derived from the video-tape-recorder-design based anti-copying process, thereby identifying potential anti-copying artifacts.

Each potential artifact on a scan line is counted. The count for each scan line is cross-correlated with an expected range and/or an expected number of artifacts derived from the video-tape-recorder-design based anti-copying process. If a scan line is found to have the expected number of artifacts, that scan line is identified as potentially modified.

The identification of potentially modified scan lines is performed for multiple scan lines, over multiple frames, for the selected portion of the video signal. The results of this multidimensional identification of potentially modified scan lines are cross-correlated with a predefined expectation derived from the video-tape-recorder-design based anti-copying process. If an expected minimum number of scan lines have the expected number of artifacts across multiple frames, the video signal is identified as modified by the anti-copying process.

Further features and advantages of the invention as well as the structure and operation of various embodiments of the invention are described in detail below with reference to the accompanying drawings.

DETAILED DESCRIPTION OF THE INVENTION

The present invention is directed toward a system and method for applying traditional video-tape-recorder-design based anti-copying processes to modern digital video recording systems. The present invention is disclosed and described herein in terms of a video capture card coupled with a general purpose personal computer. However, after reading this description it will become apparent to one skilled in the relevant art(s) how to implement the invention in alternative embodiments and alternative applications. For example, alternative embodiments include digital VCRs, handheld digital cameras, personal digital assistants (PDAs) and next-generation wireless handsets. As such, the description of this example embodiment should not be construed to limit the scope and breadth of the present invention.

Figure 1:
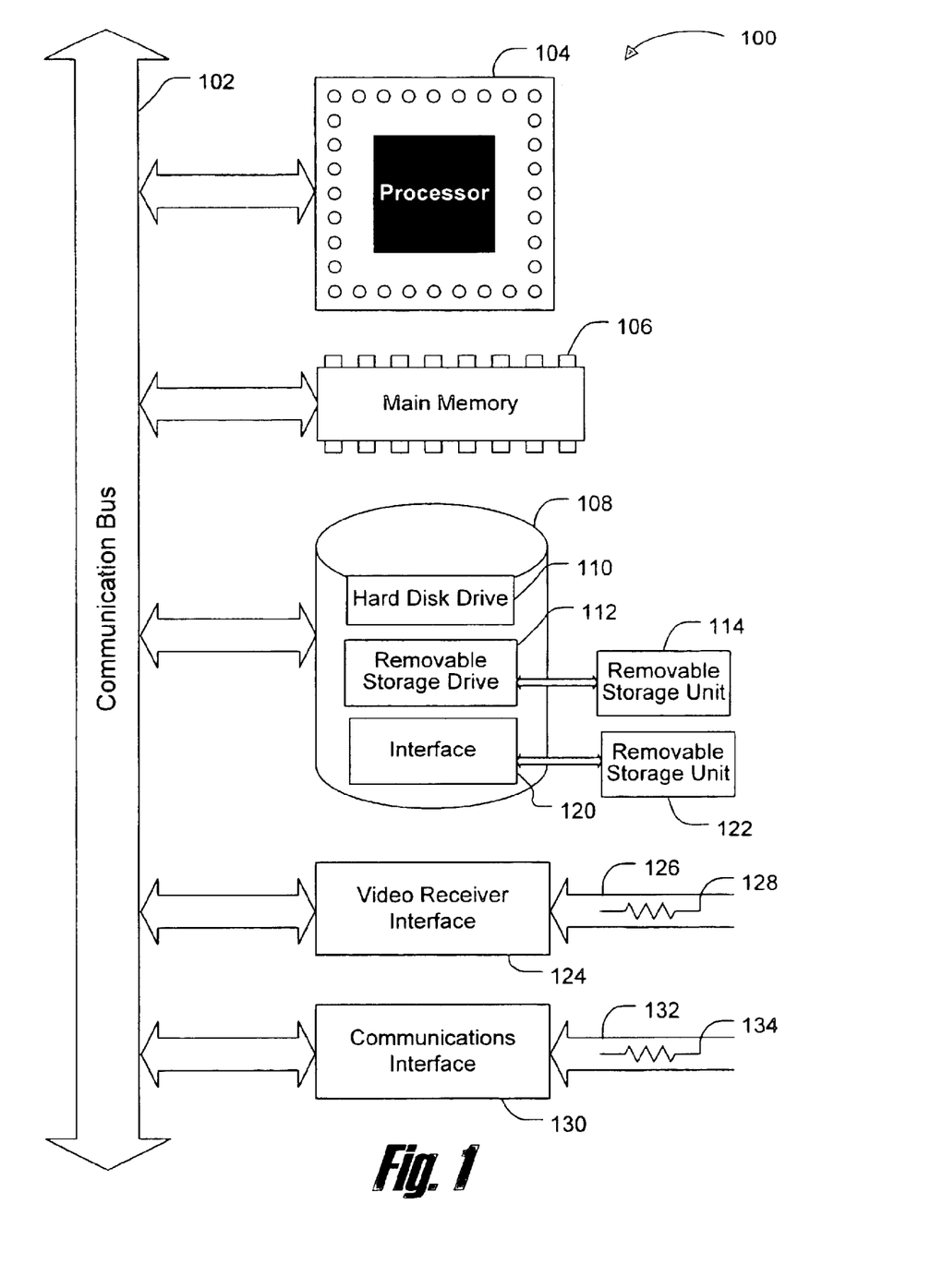
FIG. 1 is a block diagram illustrating an example computer system in which elements and functionality of the invention are implemented according to one embodiment of the present invention.

FIG. 1 is a block diagram illustrating an example computer system in which elements and functionality of the invention are implemented according to one embodiment of the present invention. The present invention may be implemented using hardware, software or a combination thereof and may be implemented in a computer system or other processing system. An exemplary computer system 100 is shown in FIG. 1. Various software embodiments are described in terms of this exemplary computer system 100. After reading this description, it will become apparent to a person having ordinary skill in the relevant art(s) how to implement the invention using other computer systems and/or computer architectures.

Referring now to FIG. 1, the computer system 100 includes one or more processors, such as processor 104. Additional processors may be provided, such as an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the processor 104.

The processor 104 is connected to a communication bus 102. The communication bus 102 may include a data channel for facilitating information transfer between storage and other peripheral components of the computer system 100. The communication bus 102 further provides the set of signals required for communication with the processor 104, including a data bus, address bus, and control bus (not shown). The communication bus 102 may comprise any known bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and the like.

Computer system 100 includes a main memory 106 and may also include a secondary memory 108. The main memory 106 provides storage of instructions and data for programs executing on the processor 104. The main memory 106 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 108 may include, for example, a hard disk drive 110 and/or a removable storage drive 112, representing a floppy disk drive, a magnetic tape drive, an optical disk drive, etc. The removable storage drive 112 reads from and/or writes to a removable storage unit 114 in a well-known manner. Removable storage unit 114, represents a floppy disk, magnetic tape, optical disk, etc. which is read by and/or written to by removable storage drive 112. As will be appreciated, the removable storage unit 114 includes a computer usable storage medium having stored therein computer software and/or data.

In alternative embodiments, secondary memory 108 may include other similar means for allowing computer programs or other instructions to be loaded into the computer system 100. Such means may include, for example, a removable storage unit 122 and an interface 120. Examples of such include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 122 and interfaces 120, which allow software and data to be transferred from the removable storage unit 122 to the computer system 100.

Computer system 100 also includes a video receiver interface 124. Video receiver interface 124 allows computer system 100 to receive analog television video signals 128 over a standard video channel 126. Analog television video signals 128 comprise waveforms in standardized formats, such as NTSC and PAL. Standard video channel 126 can be implemented using wire or cable, including a simple wire antenna, in a manner well understood in the art. Video receiver interface 124 receives the analog television video signals 128, which may be protected by video-tape-recorder-design based anti-copying processes such as Macroision's process.

In one embodiment, a software driver for video receiver interface 124 includes the functionality described herein, and thus is capable of detecting whether the analog television video signals 128 are encoded with a video-tape-recorder-design based anti-copying process such as Macrovision's process. In alternative embodiments, this functionality is built into hardware in video receiver interface 124, or comprises a combination of hardware and software.

Computer system 100 may also include a communications interface 130. Communications interface 130 allows software and data to be transferred between computer system 100 and external devices, networks or information sources. Examples of communications interface 130 include a modem, a cable modem, a network interface (such as an Ethernet card), a communications port, a PCMCIA slot and card, etc. Communications interface 130 preferably implements industry promulgated architecture standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/internet protocol (TCP/IP), serial line Internet protoco/point to point protocol (SLIP/PPP), Data Over Cable Service Interface Specification (DOCSIS), and so on.

Software and data transferred via communications interface 130 are in the form of signals 134 which can be electronic, electromagnetic, optical or other signals capable of being received by communications interface 130. These signals 134 are provided to communications interface 130 via a channel 132. This channel 132 carries signals 134 and can be implemented using wire or cable, fiber optics, a phone line, a cellular phone link, a radio frequency (RF) link, infrared interface (IR) or other communications channels. Data signals 134 can be digital video signals, such as those making up a digital video broadcast (DVB), and may have encoded therein artifacts that reflect protection by video-tape-recorder-design based anti-copying processes such as Macrovision's process.

In one embodiment, a software driver for communications interface 130 includes the functionality described herein, and thus is capable of detecting whether the signals 134 are encoded with a video-tape-recorder-design based anti-copying process artifacts. In alternative embodiments, this functionality is built into hardware in communications interface 130, or comprises a combination of hardware and software.

Computer programming instructions (also known as computer programs or software) are stored in the main memory 106 and/or the secondary memory 108. Computer programs can also be received via communications interface 130. Such computer programs, when executed, enable the computer system 100 to perform the features of the present invention as discussed herein. In particular, the computer programs, when executed, enable the processor 104 to perform the features and functions of the present invention. Accordingly, such computer programs represent controllers of the computer system 100.

In alternative embodiments, television video interface 124 and communications interface 130 are one and the same. In these alternative embodiments, this combined communications interface receives television video signals 128 and signals 134 over a single channel 134, or alternatively over multiple channels simultaneously.

In this document, the term "computer program product" is used to refer to any media used to provide programming instructions to the computer system 100. Examples of these media include removable storage units 114 and 122, a hard disk installed in hard disk drive 110, and signals 134. These computer program products are means for providing programming instructions to the computer system 100

In an embodiment where the invention is implemented using software, the software may be stored in a computer program product and loaded into computer system 100 using hard drive 110, removable storage drive 112, interface 120 or communications interface 130. The software, when executed by the processor 104, causes the processor 104 to perform the features and functions of the invention as described herein.

In another embodiment, the invention is implemented primarily in hardware using, for example, hardware components such as application specific integrated circuits ("ASICs"). Implementation of the hardware state machine so as to perform the functions described herein will be apparent to persons having ordinary skill in the relevant art(s).

In yet another embodiment, the invention is implemented using a combination of both hardware and software. It should be appreciated that modification or reconfiguration of the computer system 100 of FIG. 1 by one having ordinary skill in the relevant art(s) will not depart from the scope or the spirit of the present invention.

Figure 2:
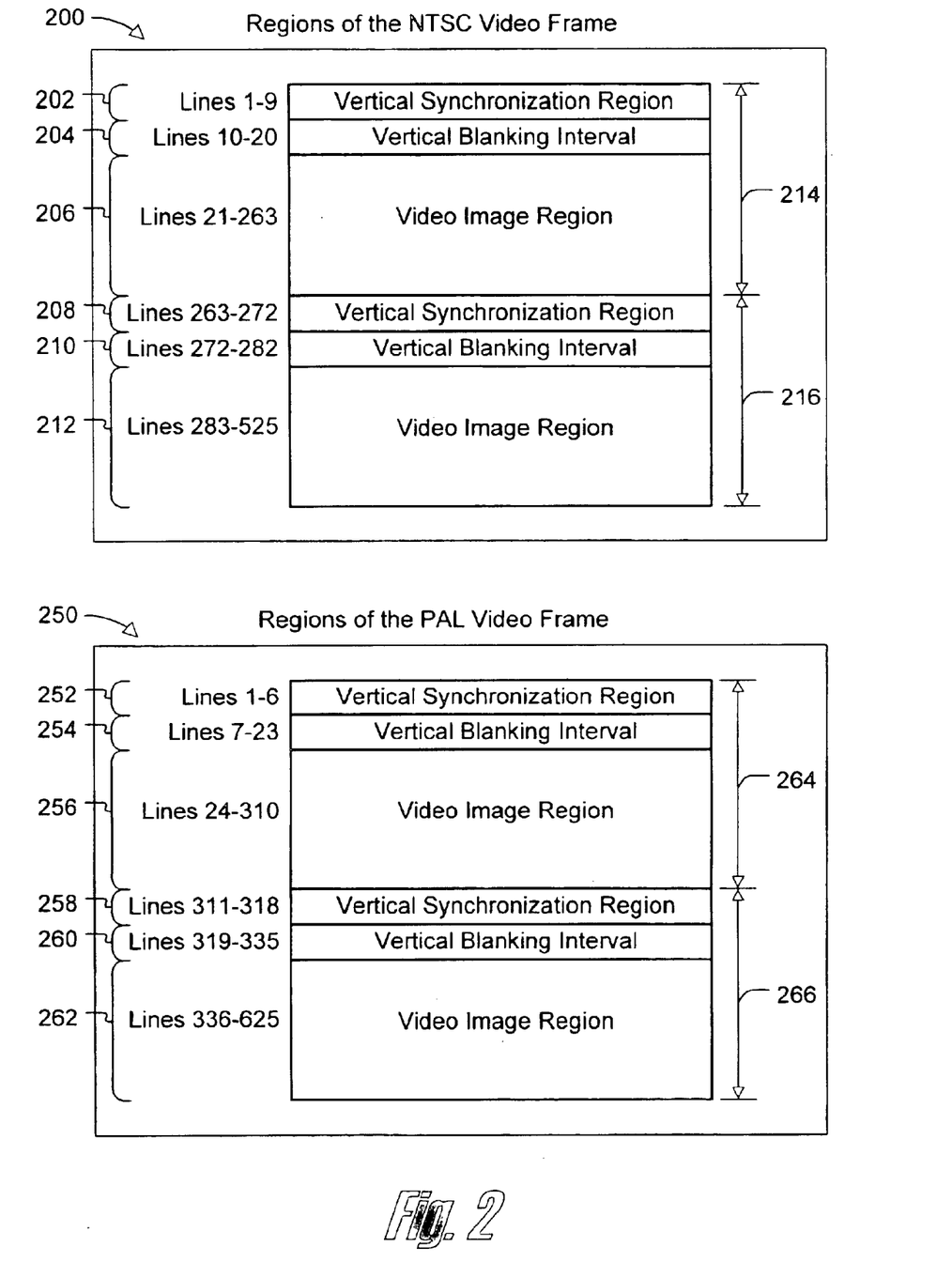
FIG. 2 is a two part layout showing regions of a video frame as defined by the NTSC and PAL television broadcasting standards.

FIG. 2 is a two part layout showing regions of a video frame as defined by the NTSC and PAL television broadcasting standards. Referring now to FIG. 2, NTSC video frame 200 comprises 525 scan lines in which there are a number of distinct regions. NTSC video frame 200 depicts the NTSC standard for interlaced video, thus NTSC video frame 200 comprises an NTSC odd field 214, which contains video information for odd lines on a display, and an NTSC even field 216, which contains video information for even lines on a display. A video image portion of the NTSC video frame 200 is contained in NTSC odd field image region 206 and NTSC even field image region 212. NTSC odd field image region 206 consists of the scan lines twenty-one through two hundred sixty three. NTSC even field image region 212 consists of the scan lines two hundred eighty three through five hundred twenty five.

A vertical synchronization portion of the NTSC video frame 200 is contained in NTSC odd field vertical synchronization region 202 and NTSC even field vertical synchronization region 208. NTSC odd field vertical synchronization region 202 consists of the scan lines one through nine. NTSC even field vertical synchronization region 208 consists of the scan lines two hundred sixty three through two hundred seventy two.

In addition, there is a portion of the NTSC video frame 200 which can contain non-video ancillary data. For example, this ancillary data portion can be used to encode closed captioning, teletext and extended data services, such as a program rating service. This ancillary data portion of the NTSC video frame 200 is contained in NTSC odd field vertical blanking interval 204 and NTSC even field vertical blanking interval 210. NTSC odd field vertical blanking interval 204 consists of the scan lines ten through twenty. NTSC even field vertical blanking interval 210 consists of the scan lines two hundred seventy two through two hundred eighty two.

PAL video frame 250 comprises 625 scan lines in which there are a number of distinct regions. PAL video frame 250 depicts the PAL standard for interlaced video, thus PAL video frame 250 comprises a PAL odd field 264, which contains video information for odd lines on a display, and a PAL even field 266, which contains video information for even lines on a display. A video image portion of the PAL video frame 250 is contained in PAL odd field image region 256 and PAL even field image region 262. PAL odd field image region 256 consists of the scan lines twenty-four through three hundred ten. PAL even field image region 262 consists of the scan lines three hundred thirty six through six hundred twenty five.

A vertical synchronization portion of the PAL video frame 250 is contained in PAL odd field vertical synchronization region 252 and PAL even field vertical synchronization region 258. PAL odd field vertical synchronization region 252 consists of the scan lines one through six. PAL even field vertical synchronization region 258 consists of the scan lines three hundred eleven through three hundred eighteen.

In addition, there is a portion of the PAL video frame 250 which can contain non-video ancillary data. For example, this ancillary data portion can be used to encode closed captioning, teletext and extended data services, such as a program rating service. This ancillary data portion of the PAL video frame 250 is contained in PAL odd field vertical blanking interval 254 and PAL even field vertical blanking interval 260. PAL odd field vertical blanking interval 254 consists of the scan lines seven through twenty-three. PAL even field vertical blanking interval 260 consists of the scan lines three hundred nineteen through three hundred thirty five.

The present invention is disclosed herein in terms of an anti-copying process that only places anti-copying artifacts in the vertical blanking interval. Thus, when a video signal is in NTSC format, the present invention looks for potential anti-copying artifacts within VBI scan lines comprising the NTSC odd field vertical blanking interval 204 and the NTSC even field vertical blanking interval 210. Likewise, when a video signal is in PAL format, the present invention looks for potential anti-copying artifacts within VBI scan lines comprising the PAL odd field vertical blanking interval 254 and the PAL even field vertical blanking interval 260.

But those skilled in the art understand that the methods disclosed herein are equally applicable to anti-copying processes that use alternative portions of a composite video signal. Moreover, although the present invention is disclosed in FIGS. 2 and 3 in terms of a particular version of Macrovision encoding, one skilled in the relevant art(s) will understand from the disclosure provided herein that the present invention is applicable to multiple alternative implementations of Macrovision's process or alternative video-tape-recorder-design based anti-copying processes, as well as multiple other broadcast standards. As such, the description of this example embodiment should not be construed to limit the scope and breadth of the present invention.

Figure 3:
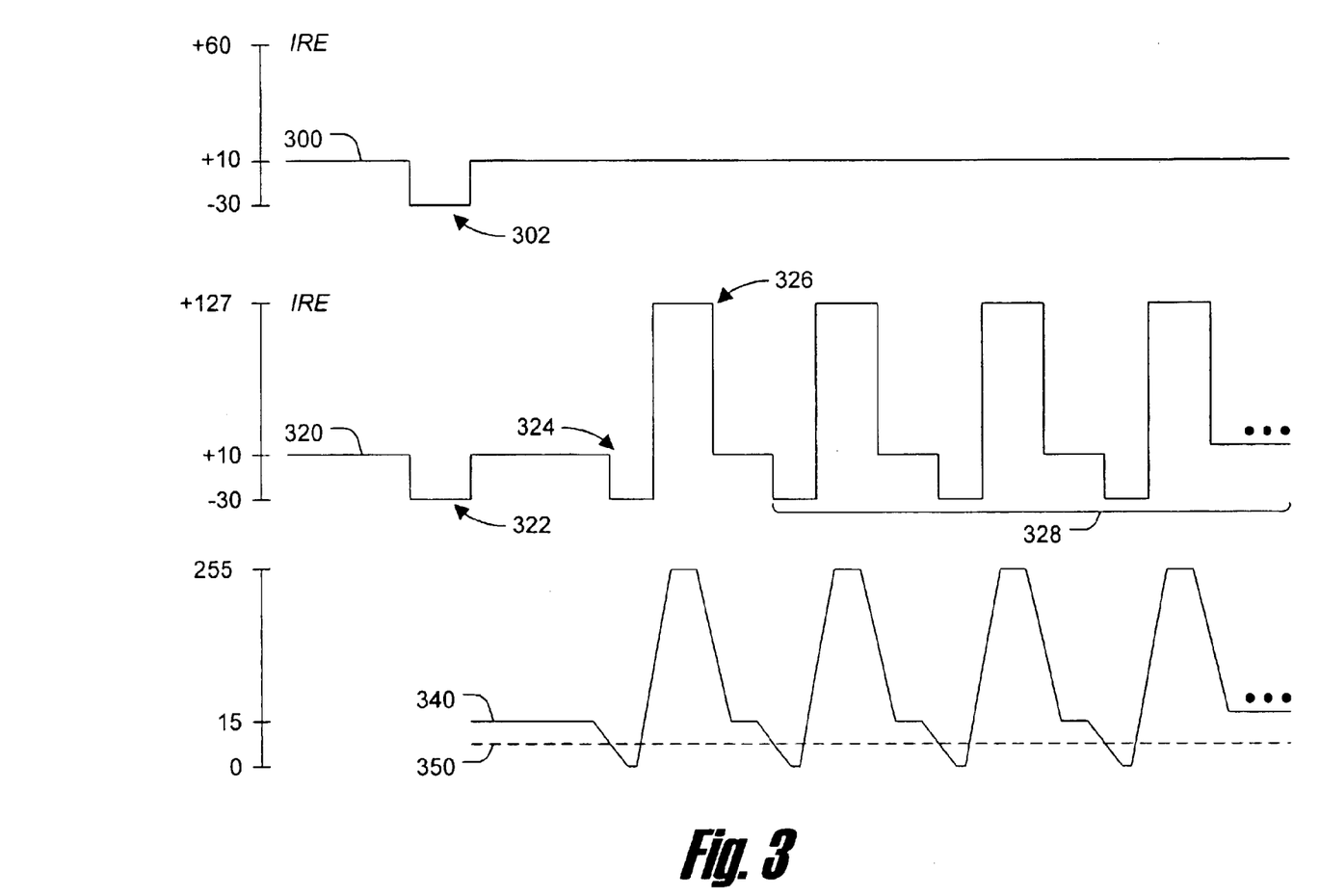
FIG. 3 is a three part composite graph depicting exemplary changes in an NTSC scan line created by an exemplary version of Macrovision encoding and detection.

FIG. 3 is a three part composite graph depicting exemplary changes in an NTSC scan line created by an exemplary version of Macrovision encoding and detection. Referring now to FIG. 3, the first two parts of the composite graph show IRE values for a VBI scan line plotted against time. An IRE unit is an arbitrary unit used to describe the amplitude characteristics of a video signal. One IRE corresponds to approximately 7.14 mV. The third part of the composite graph shows normalized values for a processed VBI scan line plotted against time. The normalized values have been scaled to fall into the range zero to two hundred and fifty five.

A typical VBI line 300 is a standard VBI line with a horizontal synchronization pulse 302. Horizontal synchronization pulse 302 is a control signal that identifies the start of a new horizontal scan line. In this exemplary embodiment, horizontal synchronization pulse 302 is a negative pulse of approximately 40 IRE amplitude, going from a VBI blanking level of +10 IRE to −30 IRE.

A modified VBI line 320 is a VBI line modified by an exemplary version of Macrovision's anti-copying process. Following a horizontal sync pulse 322, modified VBI line 320 includes a pseudo-sync pulse 324 and an AGC pulse 326. In this exemplary version of Macrovision's anti-copying process, pseudo-sync pulse 324 begins after the leading edge of the horizontal sync pulse 322. Pseudo-sync pulse 324 is a negative pulse of approximately 40 IRE amplitude, going from a VBI blanking level of +10 IRE to −30 IRE.

Immediately following pseudo-sync pulse 324 is AGC pulse 326. AGC pulse 326 is a positive pulse of variable amplitude. Following AGC pulse 326 is a set of one or more paired pseudo-sync and AGC pulses 328 that are each similar to the previous pair, pseudo-sync pulse 324 and AGC pulse 326. The combination of these pseudo-sync pulses and variable AGC pulses cause a VCR head, which is trying to sync up with a modified video signal comprising modified VBI line 320, to attempt synchronization with incorrect portions of the video image, thereby distorting the image recorded.

The total number of paired pseudo-sync and AGC pulses on a modified VBI line 320 is variable. In accordance with the present invention, the total number of encoded artifacts is within the range known to the process controller so that presence of anti-copying artifcats can be detected. Where Macrovision's anti-copying process is used, the total number of paired pseudo-sync and AGC pulses varies within a predefined range, and the number of paired pseudo-sync and AGC pulses per VBI line is consistent across all frames for a particular encoding. The numerical value of the predefined range for the number of paired pseudo-sync and AGC pulses for Macrovision's process is the confidential information of Macrovision and is available under appropriate agreement with Macrovision.

Processed VBI line 340 is a VBI line that has been normalized and filtered according to one embodiment of the present invention. In this embodiment, the filtering is performed by running the VBI line through a moving average generator, which is essentially a finite impulse response filter with unity gains. This produces a smoothed out version of the waveform, thereby eliminating much of the potential noise in the video signal. Although the video signal will be clean in general, there can be many sources of noise that can cause problems for a detector such as disclosed herein, especially if the video signal is being received via a simple antenna.

In one embodiment, a window for the moving average generator is kept smaller than pseudo-sync pulse 324, thereby helping to ensure that the output of the filter comes down to a minimum at the expected pulse amplitude of the pseudo-sync pulse 324. In this fashion, comparison of processed VBI line 340 with threshold 350 is made more robust. In this embodiment, threshold 350 is approximately halfway between the VBI blanking level and the expected pulse amplitude of the pseudo-sync pulse 324.

Although the present invention is disclosed herein in terms of counting psuedo-sync pulses, any regular pulses generated by a video-tape-recorder-design based anti-copying process can be counted. For example, where Macrovision's process is used, the present invention can also detect Macrovision by counting the AGC pulses, taking amplitude fading into account.

Figure 4A:
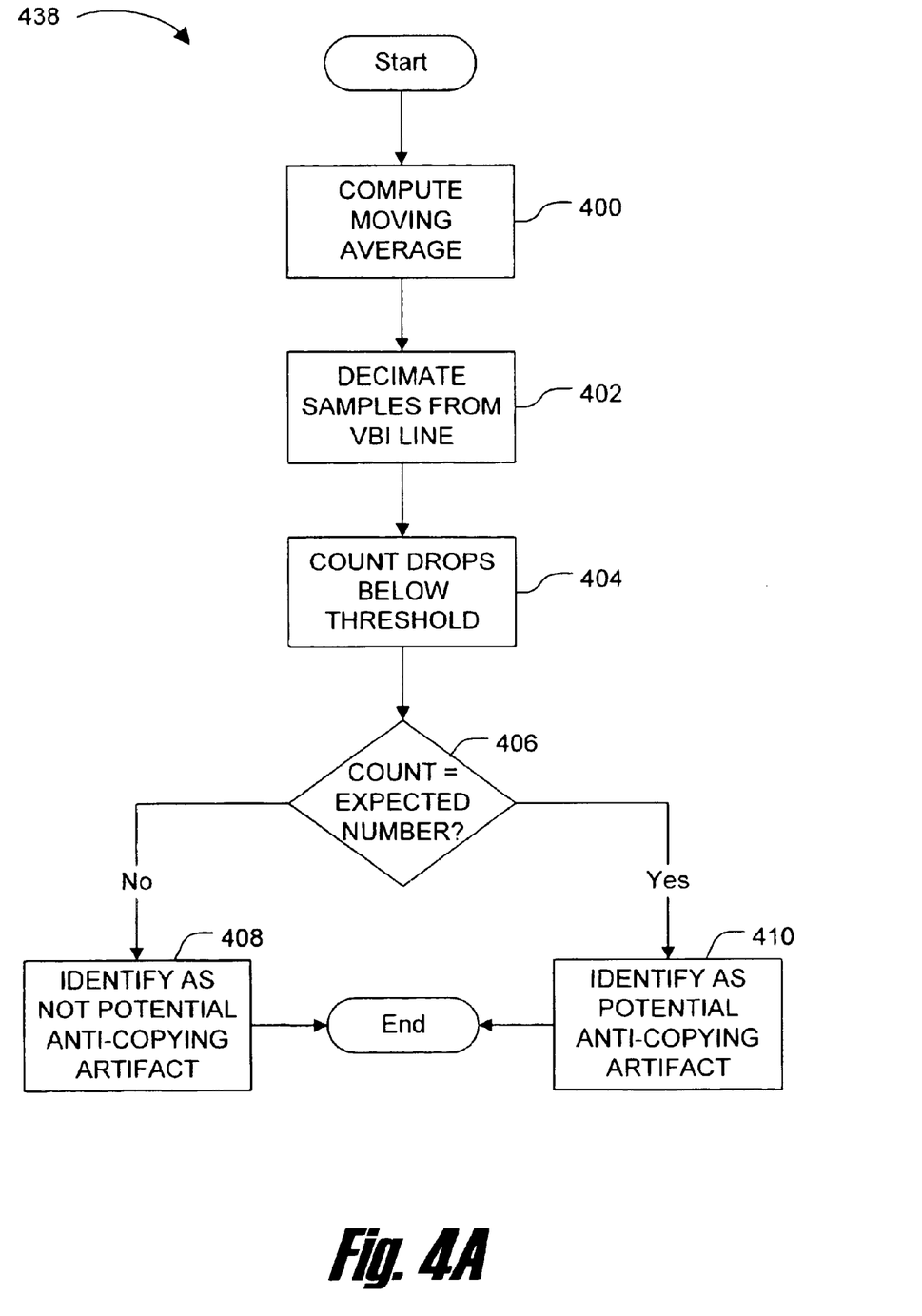
FIGS. 4A, 4B and 4C are a flow chart depicting a process for detecting anti-copying artifacts in a video signal according to one embodiment of the present invention.
Figure 4B:
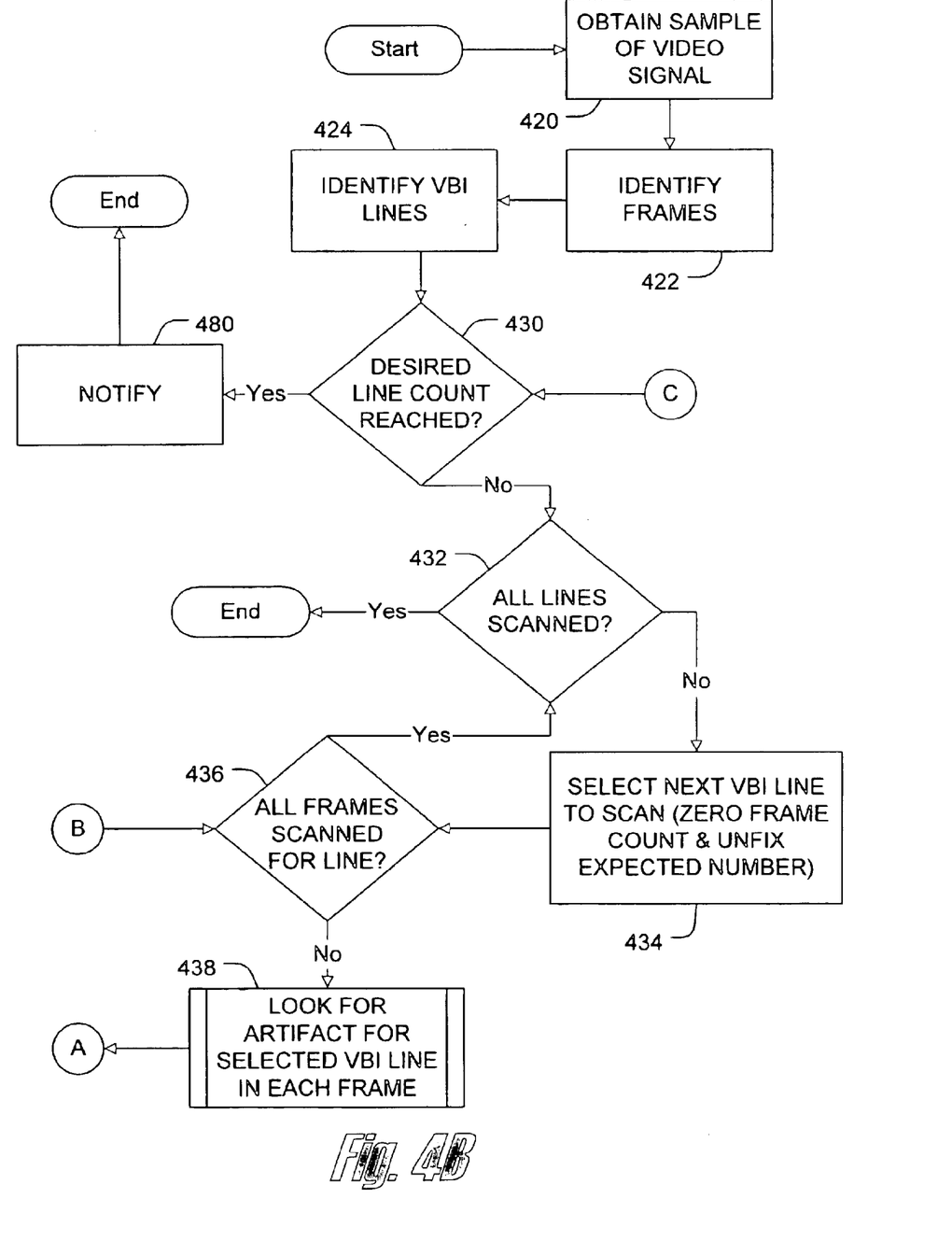
Figure 4C:
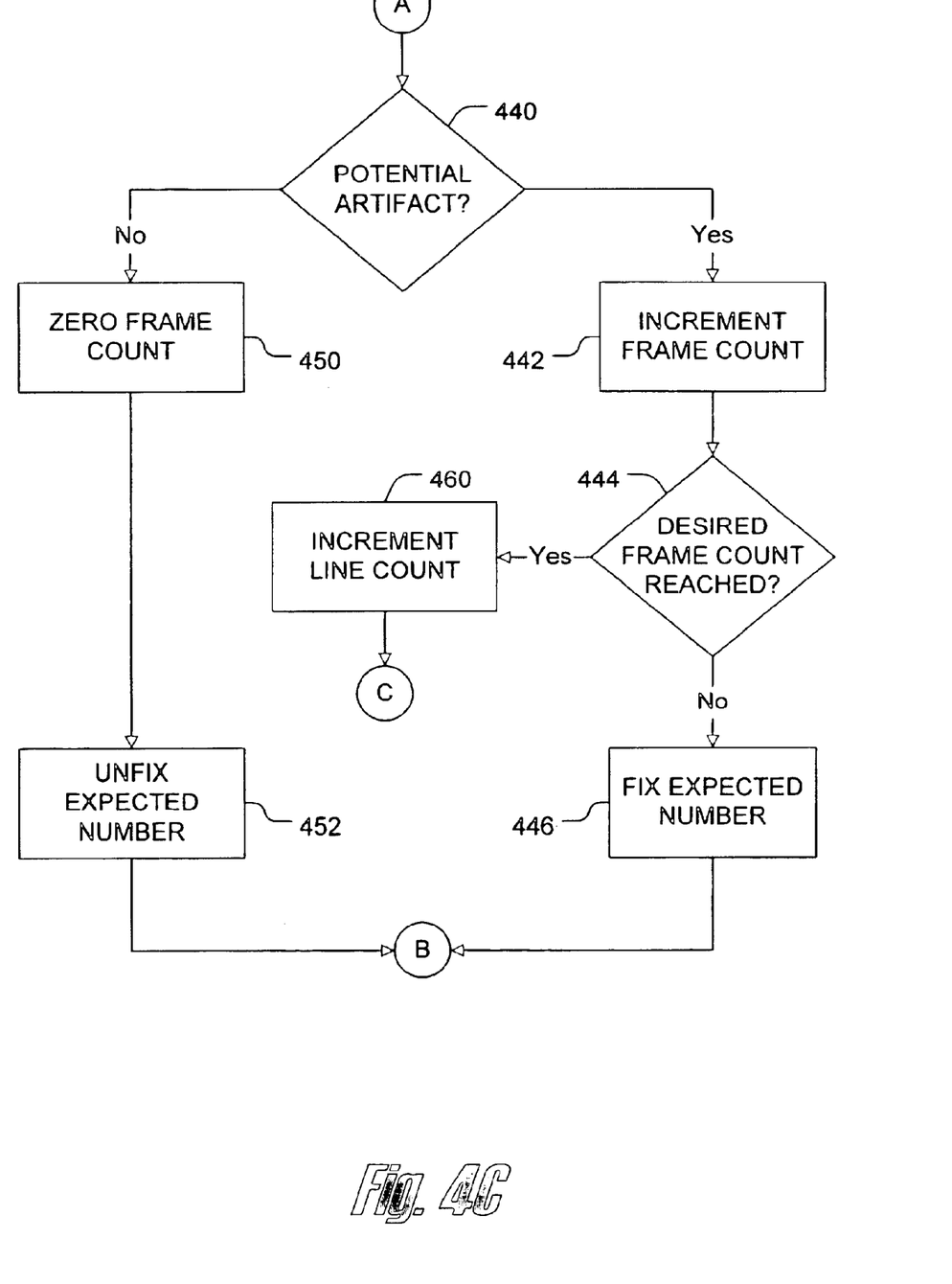

FIGS. 4A, 4B and 4C are a flow chart depicting a process for detecting anti-copying artifacts in a video signal according to one embodiment of the present invention. FIG. 4A is a flow chart depicting a variable sub-process for recognizing potential anti-copying artifacts on a single VBI line. The present invention is disclosed herein in terms of a main process (depicted in FIGS. 4B and 4C) calling the variable sub-processes (depicted in FIG. 4A) for the purpose of clarity. Alternatively, the variable sub-process depicted in FIG. 4A may be part of a single unified process. In this alternative embodiment, steps 400 through 404 on FIG. 4A are equivalent to step 438 on FIG. 4B, step 406 on FIG. 4A is equivalent to step 440 on FIG. 4C, and steps 408 and 410 on FIG. 4A are unnecessary.

Referring now to FIG. 4A, the sub-process begins with step 400 in which VBI line data is filtered by generating a moving average. The moving average of the VBI line data is generated in step 400 to eliminate some of the noise in the video signal. Although generally the video signal will be clean, signal noise is a common occurrence in video systems, especially when the signal is being received by an antenna.

In one embodiment, step 400 is performed by using a low computation load version of the moving average such as that defined by the equation:

(1) $t[n]=t[n-1]+u[n]-u[n-N]$

In equation one, n is discrete time, u[n] is the value of the current sample, u[n−N] is the value of the sample N units of time previous, and t[n] is the moving average signal multiplied by N. Because the only use made of the moving average is comparison with a threshold, t[n] is used instead of a true moving average, thereby avoiding unnecessary division; the threshold is adjusted by N accordingly.

In this embodiment, N is an effective window size for the moving average generator and is set to a value generally equal to or just less than the width of a pulse being detected. Although a larger window eliminates more noise, it also smoothes out real data. Thus by setting the window size as described herein, the present invention eliminates noise in the video signal while also ensuring that the filtered output still comes down to a single minimum.

Following step 400, the sub-process decimates the samples from the VBI line data in step 402. In one embodiment, the VBI line data is sampled at a much higher rate than necessary to implement the present invention. For NTSC, the VBI sampling rate is 28.6 MHz. For PAL, the VBI sampling rate is 35.5 MHz. Thus, step 402 decimates the filter output by eight (i.e. seven of every eight samples are ignored) to reduce computational load, without diminishing the detection ability of the present invention. The decimation factor is dependent upon the width of the pseudo-sync pulse, and is selected to minimize computational load while ensuring that the pseudo-sync pulse will still be detected.

In step 404, the sub-process counts a number of times the VBI line data drops below a threshold, thereby identifying a number of potential artifacts. The threshold is approximately halfway between the VBI blanking level and the expected pulse amplitude of the pseudo-sync pulse. In alternative embodiments, the threshold is adjusted based on factors such as variations in the amplitude of the pulse being detected and the decimation factor selected.

Once the VBI line data for a current VBI line has been processed completely, the sub-process compares the number of potential artifacts with an expected number in step 406. The expected number is either a range of values or a single value. The range of values is determined by the particular video-tape-recorder-design based anti-copying process cross-correlated with a broadcasting standard, such as NTSC or PAL, for the particular video signal being processed. Whether step 406 compares the number of potential artifacts with the range of values or with the single value is determined by a state of the main process that initiated the sub-process described in FIG. 4A.

If the number of potential artifacts equals the expected number, control passes to step 410. In step 410, the sub-process identifies the current VBI line as containing a potential anti-copying artifact. If the number of potential artifacts does not equal the expected number, control passes to step 408. In step 408, the sub-process identifies the current VBI line as not containing a potential anti-copying artifact.

Referring now to FIG. 4B, the main process begins with step 420 in which a sample of the video signal is obtained. The sample of the video signal is of sufficient length to allow detection of anti-copying artifacts across multiple frames of the video signal. In one embodiment, the sample of the video signal is six frames in length. Alternatively, the video signal may be scanned for anti-copying artifacts as it is received ("active feed"), thereby eliminating the need for step 420.

In step 422, the process identifies the frames in the sample based on the broadcasting standard, such as NTSC or PAL, and at least one vertical synchronization pulse. Following step 422, the process identifies the VBI scan lines (VBI lines) in step 424 based on the broadcasting standard, such as NTSC or PAL, and at least one horizontal synchronization pulse. In one embodiment, steps 422 and 424 are performed by first identifying the broadcasting standard, locating a synchronization point within the sample, and thereafter using predefined constants for the identified broadcasting standard in subsequent process steps.

In the active-feed embodiment, with no step 420, steps 422 and 424 are performed by first identifying the broadcasting standard and thereafter locating the appropriate synchronization pulses in the subsequent process steps. Those skilled in the relevant art(s) will understand how to implement this active-feed embodiment of the present invention given the disclosure herein.

In step 430, the process checks whether a desired line count has been reached by checking a line count. The line count is equal to the number of VBI lines on which the process has found potential anti-copying artifacts over multiple frames. The desired line count is based upon a predefined minimum number of lines encoded with artifacts. Macrovision's process, for example, specifies a set of scan lines that may be encoded with pseudo-sync pulses during the encoding process. As disclosed herein, this set of scan lines is equivalent to the VBI lines. Macrovision's process also specifies the predefined minimum number of VBI lines that are encoded with pseudo-sync pulses, and thus the desired line count used in step 430. In alternative embodiments, however, the set of scan lines that may be encoded can be taken from any of the scan lines defined by the particular broadcasting standard, such as NTSC or PAL.

On the first pass through step 430, the line count will be zero. Thus control will pass to step 432. When the line count equals the desired line count in step 430, an anti-copying signal has been detected, and control passes to step 480. In step 480, the process sends a notification that anti-copying artifacts have been detected on the video signal to an appropriate calling routine or output.

While the desired number of lines has not been reached in step 430, control passes to step 432 in which the process checks whether all the VBI lines have been scanned. If so, the process ends. If not, control passes to step 434.

In step 434, the process selects the next VBI line to scan. The next VBI line to scan is the VBI line that follows the last VBI line scanned. Hereinafter, the next VBI line to scan is referred to as a current VBI line. Also in step 434, the process sets a frame count to zero and sets the expected number to the range of values described previously in connection with step 406. (The frame count is discussed in more detail supra in connection with step 442.)

Following step 434, the process checks in step 436 whether the current VBI line has been scanned for all the frames in the sample. If so, control passes back to step 432. If not, control passes to step 438. Alternatively, step 436 may check the frame count, a desired frame count, and a number of frames left to be scanned. (The desired frame count is discussed in more detail supra in connection with step 444.) If the number of frames left to be scanned is less than the desired frame count minus the frame count, then control passes to step 432. Otherwise, control passes to step 438.

Step 438 is the variable sub-process for recognizing potential anti-copying artifacts depicted in FIG. 4A and described previously. Step 438 checks for potential anti-copying artifacts on the current VBI line for the next frame before proceeding to step 440 on FIG. 4C.

Referring now to FIG. 4C, in step 440, the process checks whether the current VBI line was identified as containing a potential anti-copying artifact. If so, control passes to step 442. If not, control passes to step 450.

In step 450, the process sets the frame count to zero. Then in step 452, the process sets the expected number to the range of values described previously in connection with step 406. Following step 452, the process returns to step 436 on FIG. 4B.

If the process recognizes potential anti-copying artifacts, this fact is identified in step 440, and control passes to step 442. The process increments the frame count in step 442. The frame count equals the number of consecutive frames having a potential artifact on the current VBI line. Following step 442, the process checks whether the frame count is equal to a desired frame count in step 444. If so, control passes to step 460. If not, control passes to step 446.

Although it is possible to detect anti-copying artifacts by scanning only a single frame of the video signal, in one embodiment, at least two frames are scanned for each VBI line. The combination of noise with other artifacts on the VBI lines, such as closed captioning or teletext information, can possibly be misidentified as an anti-copying artifact if only a single frame of the video signal is checked. Thus, by checking multiple frames as defined by the desired frame count used in step 444, the present invention creates a robust detection method. In one embodiment, the desired frame count is five. Thus, five consecutive frames must have the same potential anti-copying artifact present on the current VBI line before that current VBI line is identified as containing an anti-copying artifact.

If the desired frame count has not been reached, control passes from step 444 to step 446, in which the expected number is set to a single value equal to the number of potential artifacts found for the current VBI line for the current frame. Where Macrovision's process is used, the number of psuedo-sync pulses for a particular VBI line is fixed for that line over all frames from a single encoding. Thus once the process finds a VBI line with the proper range of pseudo-sync pulses, each identical VBI line from subsequent frames must have the same number of pseudo-sync pulses before the process will identify it as a Macrovision signal. In other anti-copying processes, this consistency across multiple frames may not be present, thus only the range of values comparison is used and step 446 is unnecessary. Following step 446, the process returns to step 436 on FIG. 4B.

If the desired frame count has been reached, the process makes this determination in step 444, and control passes to step 460. In step 460, the line count is incremented. Then control passes back to step 430 on FIG. 4B. The process then continues until either all VBI lines have been scanned as determined in step 432 on FIG. 4B, or an anti-copying signal is detected as determined in step 430 on FIG. 4B.

While various embodiments of the present invention have been described above, it should be understood that they have been presented by way of example only, and not limitation. It is to be understood that the description and drawings represent the presently preferred embodiment of the invention and are, as such, representative of the subject matter which is broadly contemplated by the present invention. Furthermore, the scope of the present invention fully encompasses other embodiments that may become obvious to those skilled in the relevant art(s). Thus, the breadth and scope of the present invention should not be limited by any of the above-described exemplary embodiments, but should be defined only in accordance with the following claims and their equivalents.

What is claimed is:

1. In a digital recording system having a video receiver interface, a method for identifying whether a video signal has been modified by a video-tape-recorder-design based anti-copying process, said method comprising the steps of:
   identifying frames in the video signal based upon a broadcasting standard, and identifying a proper portion of the video signal based upon the broadcasting standard and the video-tape-recorder-design based anti-copying process;
   filtering noise from the proper portion of the video signal by calculating a moving average over a time frame that is selected based upon an expected time dimension of potential artifacts;
   recognizing potential artifacts in the proper portion of the video signal by determining whether a segment of the proper portion of the video signal has crossed a predefined threshold;
   counting the potential artifacts; and
   cross-correlating results from said counting step with a predefined expectation derived from the anti-copying process.

2. The method of claim 1, the method further comprising the steps of:
   obtaining a discrete sample of the video signal prior to said identifying step; and
   eliminating a majority of data elements from the discrete sample prior to said recognizing step.

3. The method of claim 1, wherein the proper portion comprises scan lines, which may contain potential artifacts, within at least two of the frames, said scan lines having numerical positions within the frames.

4. The method of claim 3, wherein said cross-correlating step further comprises the steps of:
   finding a plurality of potentially modified lines comprising at least two of the scan lines, which each contain at least two potential artifacts; and
   establishing that a potential artifact count for each of the plurality of potentially modified lines, the potential artifact count determined by said counting step, has the format of an equal number of the potential artifacts for each scan line, of equal position within the frames, included within the plurality of potentially modified lines across each of the at least two of the frames.

5. A computer program product on a computer readable medium for identifying whether a video signal has been modified by a video-tape-recorder-design based anti-copying process, said computer program product comprising:
   instructions for identifying frames in the video signal based upon a broadcasting standard;
   instructions for identifying a proper portion of the video signal based upon the broadcasting standard and the video-tape-recorder-design based anti-copying process;
   instructions for recognizing potential artifacts in the proper portion of the video signal;
   instructions for filtering, noise from the proper portion of the video signal, comprising instructions for calculating a moving average over a time frame that is selected based upon an expected time dimension of the potential artifacts;
   instructions for counting the potential artifacts; and
   instructions for cross-correlating results from said instructions for counting with a predefined expectation derived from the anti-copying process.

6. The computer program product of claim 5, further comprising:
   instructions for obtaining a discrete sample of the video signal; and
   instructions for eliminating a majority of data elements from the discrete sample.

7. The computer program product of claim 5, wherein said instructions for recognizing further comprise instructions for determining that a segment of the proper portion of the video signal has crossed a threshold, which is derived from the video-tape-recorder-design based anti-copying process.

8. The computer program product of claim 5, wherein the proper portion comprises a predefined set of scan lines having numerical positions within the frames.

9. The computer program product of claim 8, wherein said instructions for recognizing further comprise instructions for determining whether an element of the predefined set of scan lines has crossed a threshold.

10. The computer program product of claim 9, wherein said instructions for cross-correlating further comprise:

instructions for finding a plurality of potentially modified lines comprising at least two elements from the predefined set of scan lines, wherein the at least two elements each contain at least two potential artifacts; and     instructions for establishing that a potential artifact count for each of the plurality of potentially modified lines, the potential artifact count being determined by said instructions for counting, has the format of an equal number of the potential artifacts for each scan line of equal position within the frames.

11. A digital video recording system comprising:

a video receiver interface for receiving a video signal;

a central processing unit coupled with said video receiver interface; and a detector, which counts potential anti-copying artifacts in a proper portion of the video signal spanning multiple frames, filters noise from the proper portion by computing a modified moving average, and determines if the video signal is protected by a video-tape-recorder-design based anti-copying process by cross-correlating a count of said potential anti-copying artifacts with a predefined expectation derived from the video-tape-recorder-design based anti-copying process and a broadcasting standard.

\* \* \* \* \*